US010326380B2

(12) United States Patent
Mizukami

(10) Patent No.: US 10,326,380 B2
(45) Date of Patent: Jun. 18, 2019

(54) MOTOR DRIVE APPARATUS WITH FUNCTION TO DETECT ABNORMALITY IN POWER DEVICE

(71) Applicant: FANUC CORPORATION, Yamanashi (JP)

(72) Inventor: Shinichi Mizukami, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/908,860

(22) Filed: Mar. 1, 2018

(65) Prior Publication Data
US 2018/0269804 A1 Sep. 20, 2018

(30) Foreign Application Priority Data

Mar. 14, 2017 (JP) ................. 2017-049022

(51) Int. Cl.
H02M 1/32 (2007.01)
H02M 7/48 (2007.01)
H02P 27/00 (2006.01)
H02M 5/293 (2006.01)
H02M 7/5387 (2007.01)
(Continued)

(52) U.S. Cl.
CPC .......... *H02M 7/4826* (2013.01); *H02M 1/32* (2013.01); *H02M 5/293* (2013.01); *H02M 7/5387* (2013.01); *H02P 3/00* (2013.01); *H02P 27/00* (2013.01); *H02P 29/024* (2013.01); *H02M 2001/327* (2013.01); *H02P 2201/03* (2013.01); *H02P 2203/07* (2013.01)

(58) Field of Classification Search
CPC .......... H02M 7/4826; H02M 2001/327; H02P 27/00; H02P 2201/03
USPC ........................................................ 318/806
See application file for complete search history.

(56) References Cited

U.S. PATENT DOCUMENTS 8,362,726 B2 * 1/2013 Kawamura ............... H02P 6/16
318/400.01
8,633,664 B2 * 1/2014 Endoh ...................... H02M 1/32
318/400.21
(Continued)

FOREIGN PATENT DOCUMENTS

JP H6-115836 A 4/1994
JP H6-165480 A 6/1994
(Continued)

Primary Examiner — Kawing Chan
(74) Attorney, Agent, or Firm — Hauptman Ham, LLP

(57) ABSTRACT

A motor drive apparatus includes: a converter which converts AC power to DC power and to output the DC power to a DC link; an inverter including power devices which converts the DC power to AC power for driving a motor; a capacitor provided in the DC link; a shut-off circuit to open and close an electrical path between the AC power source and the converter; a constant current control unit which performs control in such a manner as to allow a constant current supplied by the capacitor to pass through a detection target power device among the power devices in the inverter; and an abnormality detection unit which detects an abnormality in the detection target power device based on changes in voltage between a collector and an emitter of the detection target power device during a period in which the constant current passes through the detection target power device.

5 Claims, 6 Drawing Sheets

(51) Int. Cl.
*H02P 29/024* (2016.01)
*H02P 3/00* (2006.01)

(56) References Cited

U.S. PATENT DOCUMENTS

| | | | | |
|---|---|---|---|---|
| 2008/0211439 | A1* | 9/2008 | Yokota | G01R 31/343 |
| | | | | 318/400.21 |
| 2010/0060222 | A1* | 3/2010 | Kezobo | G01R 31/42 |
| | | | | 318/490 |
| 2012/0068645 | A1* | 3/2012 | Tsuji | H02M 1/32 |
| | | | | 318/400.21 |
| 2014/0062361 | A1* | 3/2014 | Suzuki | H02M 1/08 |
| | | | | 318/400.17 |
| 2015/0160625 | A1* | 6/2015 | Yoshida | G05B 13/0265 |
| | | | | 318/561 |
| 2016/0261220 | A1* | 9/2016 | Kuroiwa | H02P 29/0241 |
| 2017/0018918 | A1* | 1/2017 | Yano | H03K 17/0822 |

FOREIGN PATENT DOCUMENTS

| | | |
|---|---|---|
| JP | H7-170754 A | 7/1995 |
| JP | H10-66388 A | 3/1998 |
| JP | 2002289856 A | 10/2002 |
| JP | 2012-229971 A | 11/2012 |

\* cited by examiner

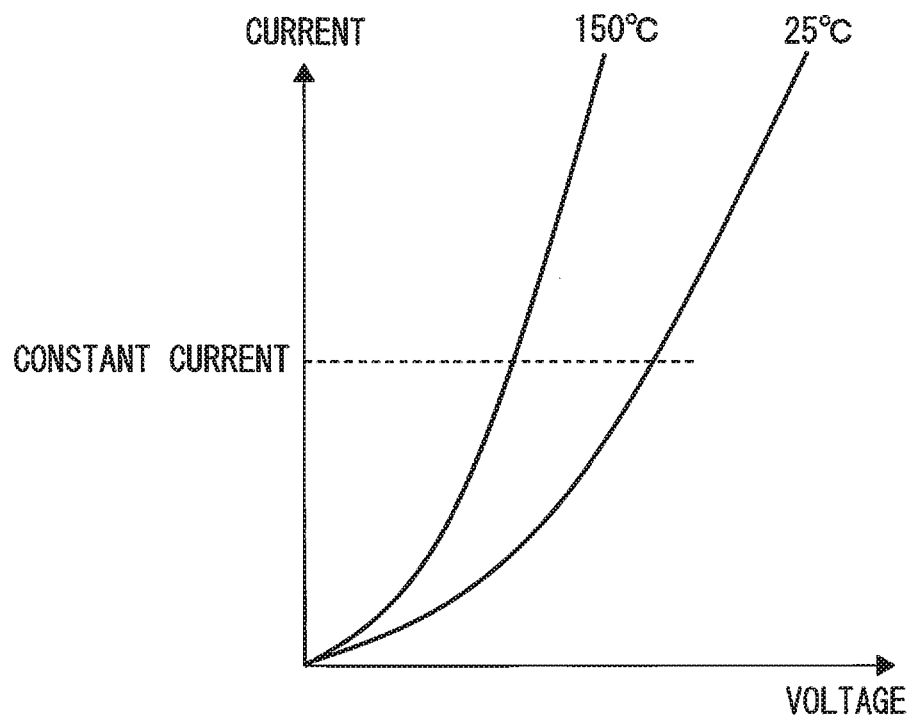

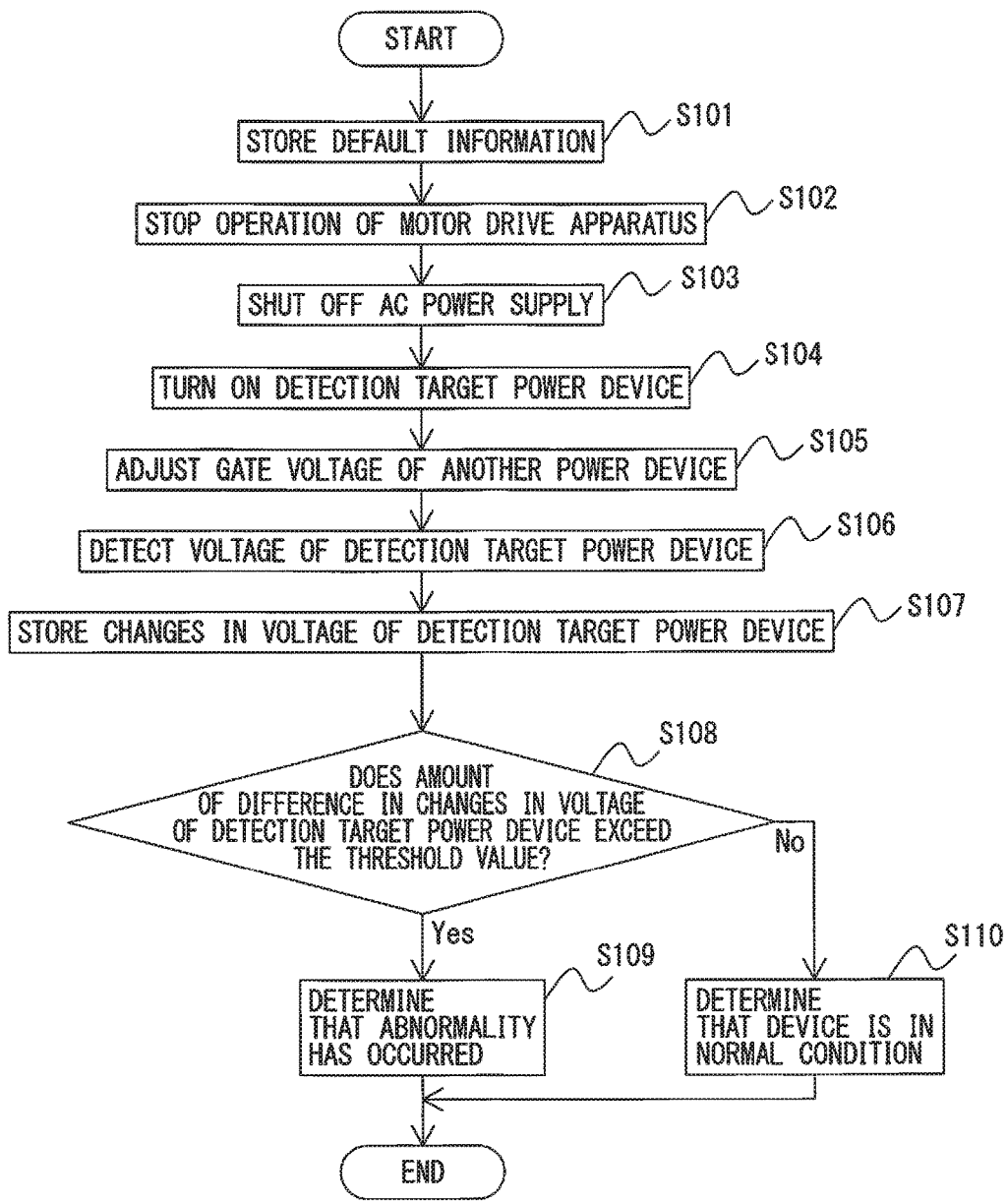

MOTOR DRIVE APPARATUS WITH FUNCTION TO DETECT ABNORMALITY IN POWER DEVICE

RELATED APPLICATIONS

The present application claims priority of Japanese Application Number 2017-049022 filed Mar. 14, 2017, the disclosure of which is hereby incorporated by reference herein in its entirety.

BACKGROUND OF THE INVENTION

1. Field of the Invention

The present invention relates to a motor drive apparatus with a function to detect an abnormality in a power device.

2. Description of the Related Art

In motor drive apparatuses for driving motors in machine tools, forming machinery, molding machines, industrial machinery, or various robots, AC power supplied by an AC power source is converted to DC power by a converter and then converted to AC power by an inverter, and this AC power is used as drive power for motors respectively provided for drive axes. The inverter includes a bridge circuit constituting a switch unit having a power device (semiconductor switching device) and a diode in antiparallel connection thereto and converts DC power to AC power and outputs the AC power by tuning on and off the power device.

When a current passes through a power device, the device heats up and excessive heating would lead to an abnormality such as a breakdown of the power device. To detect an abnormality in a power device, it is preferable to use a temperature sensor, but it is difficult to mount a temperature sensor directly on the semiconductor chip of a power device.

As a technique known for detecting the temperature of a power device without providing a separate temperature sensor, for example, Japanese Unexamined Patent Publication (Kokai) No. 2002-289856 discloses an on-chip temperature detection device including: a current-controlled semiconductor device including a base terminal, a collector terminal, an emitter terminal, and a diode based on p-n junction between the base terminal and the emitter terminal; first means for allowing a certain base current to pass through the base terminal when the control signal applied to the base terminal is off, the certain base current being smaller than a base current that would switch the current-controlled semiconductor device to the normal ON state; second means for detecting a temperature of the current-controlled semiconductor device on the basis of a forward voltage between the base and the emitter of the current-controlled semiconductor device when the certain base current smaller than a base current that would switch the current-controlled semiconductor device to the normal ON state passes the base terminal, wherein the detection of the temperature is conducted based on temperature dependence of the forward voltage of the diode based on p-n junction in the OFF state of the current-controlled semiconductor device.

SUMMARY OF INVENTION

An inverter is a component of a motor drive apparatus and includes a plurality of power devices. Since a plurality of motor drive apparatuses are provided in machine tools, forming machinery, molding machines, industrial machinery, or various robots, a very large number of power devices exist in these machines. However, to provide a temperature sensor for each semiconductor chip in a large number of power devices is disadvantageous because to do so will increase the cost and size of the motor drive apparatuses. In addition, it is difficult to mount a temperature sensor on the semiconductor chip of a power device, and a temperature sensor disposed in a place away from the semiconductor chip of the power device (for example, on a case containing the power device) does not measure the temperature of the power device accurately. Failure to detect a heating of a power device of an inverter in a motor drive apparatus may lead to less working efficiency or a serious accident because the power device is not replaced in a timely manner. A power device not yet destroyed by heat may be prematurely replaced Thus, there is a demand for a cost-effective technique for motor drive apparatuses for accurately detecting an abnormality in a power device caused by heat.

According to one aspect of the present disclosure, provided is a motor drive apparatus including a converter configured to convert AC power supplied by an AC power source to DC power and to output the DC power to a DC link; an inverter including power devices provided for an upper arm and a lower arm, which power devices are ON/OFF controlled by respective gate voltages applied thereto, to convert the DC power in the DC link to AC power for driving a motor; a capacitor provided in the DC link; a shut-off circuit to open and close an electrical path between the AC power source and the converter; a constant current control unit configured to perform control in such a manner as to allow a constant current supplied by the capacitor charged with DC power to pass through a detection target power device among the power devices in the inverter; and an abnormality detection unit configured to detect an abnormality in the detection target power device based on changes in voltage between a collector and an emitter of the detection target power device during a period in which the constant current passes through the detection target power device.

BRIEF DESCRIPTION OF THE DRAWINGS

The present invention will be understood more clearly by referring to the following accompanying drawings:

FIG. 5 illustrates examples of the relationships between the temperature of a detection target power device and the voltage between the collector and the emitter when a constant current is allowed to pass through the detection target power device;

FIG. 7 is a flowchart illustrating an operation of the motor drive apparatus according to an embodiment.

DETAILED DESCRIPTION

Figure 1:
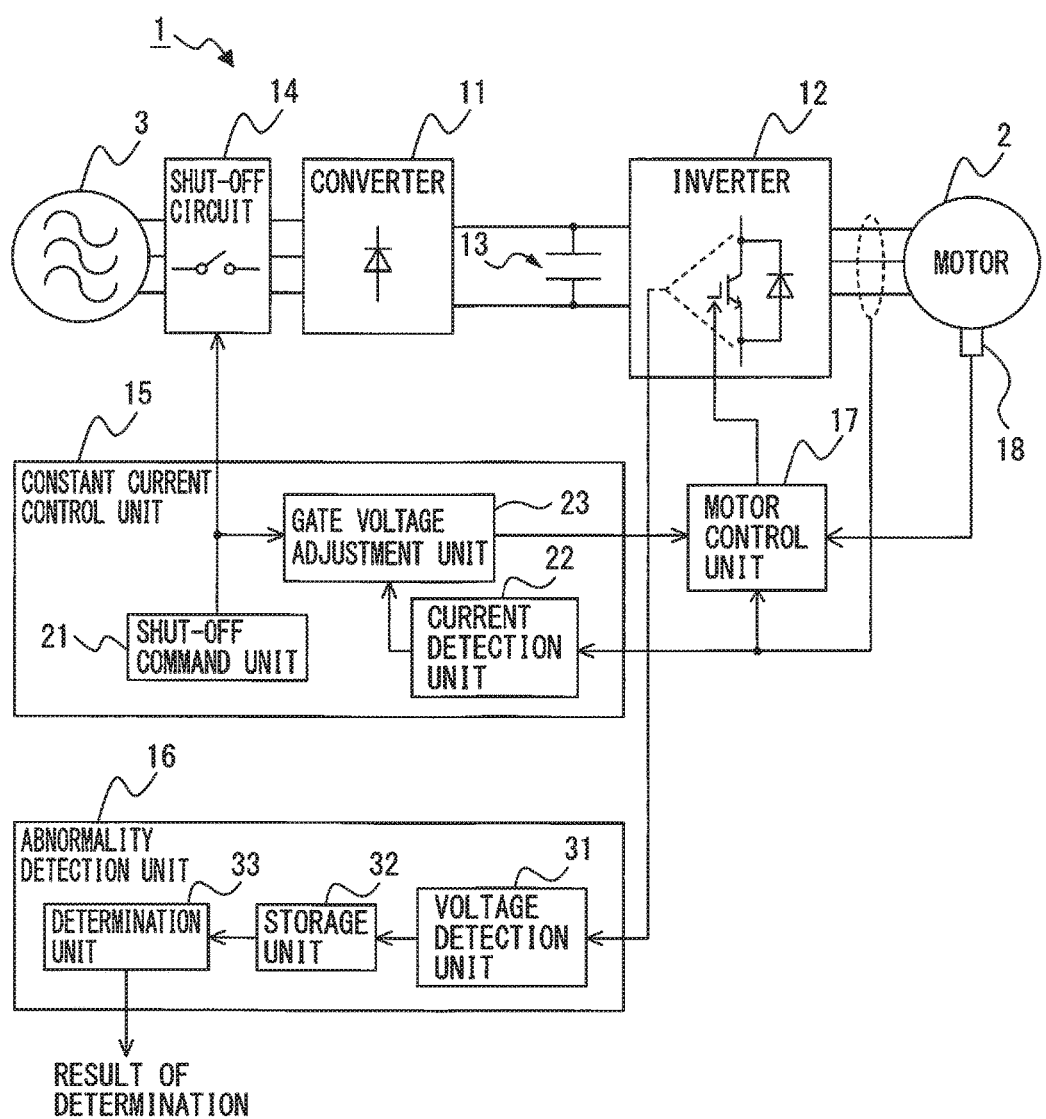
FIG. 1 illustrates a motor drive apparatus according to an embodiment.

A motor drive apparatus with a function to detect an abnormality in a power device will be described below with reference to the drawings. In the drawings, like members are denoted by like reference numerals. Constituent features denoted by like reference numerals in different drawings are to be understood to have the same functions. Further, the drawings are presented in various scales to aid the readers' understanding.

FIG. 1 illustrates a motor drive apparatus according to an embodiment. As an example, a case with a three-phase AC power source 3 and a motor drive apparatus 1 to drive a three-phase AC motor 2 will be described. Note that the present embodiment is not limited to a particular number of phases and, for example, a single-phase AC power source and a single-phase motor may be used. In addition, the present embodiment is not limited to a particular type of motor 2 and the motor 2 may, for example, be an induction motor or a synchronous motor.

A motor control unit 17 to perform drive control on a motor 2 will be described before a servo motor drive apparatus 1 according to an embodiment is described. The motor drive apparatus 1, similarly to common servo motor drive apparatuses, includes a motor control unit 17 and a velocity detection unit 18 and controls an inverter 12 configured to convert powers between the DC power of the DC link and the AC power for driving the motor 2 or regenerative AC power. The motor control unit 17 generates switching commands to control the velocity, torque, or position of the rotor of the motor 2 based on a velocity of (the rotor of) the motor 2 detected by the velocity detection unit 18 (velocity feedback), a current passing through the wiring of the motor 2 (current feedback), a certain torque command, an operation program for the motor 2, etc. The power conversion operation by the inverter 12 is controlled in accordance with the switching commands generated by the motor control unit 17.

As illustrated in FIG. 1, the motor drive apparatus 1 according to an embodiment includes a converter 11, an inverter 12, a capacitor 13, a shut-off circuit 14, a constant current control unit 15, and an abnormality detection unit 16.

The converter 11 converts the AC power supplied by the AC power source 3 to DC power and outputs the DC power to the DC link. In the example illustrated in FIG. 1, the converter 11 is constituted as a three-phase rectifying circuit since the AC power source 3 is a three-phase power supply. The converter 11 may be, for example, a diode rectifying circuit, 120-degree conducting type rectifying circuit, or a rectifying circuit based on a PWM switching control method with a power device (semiconductor switching device) inside.

A capacitor 13 is provided in a DC link connecting the DC output side of the converter 11 and DC input side of the inverter 12. The capacitor 13 is commonly called a DC link capacitor or a smoothing capacitor and performs a function of storing DC power in the DC link and reducing ripples of the DC output of the converter 11.

The inverter 12 has power devices on the upper arm and the lower arm and, as the power devices are ON/OFF controlled by gate voltages applied to them, converts the DC power of the DC link to AC power to output the AC power for driving the motor 2. The inverter 12 includes bridge circuits formed by power devices respectively in antiparallel connection with diodes. The power devices are ON/OFF controlled, for example, by gate voltages produced based on a PWM switching control method. The inverter 12 is formed as a three-phase inverter in the example illustrated in FIG. 1 as the motor 2 is a three-phase AC motor; it will be formed as a single-phase inverter when the motor 2 is a single-phase AC motor.

The power devices constituting the bridge circuits in the inverter 12 are semiconductor switching devices that allow a current of varying intensity to pass through them as a function of the gate voltage applied and may be, for example, unipolar transistors such as FETs, bipolar transistors, IGBTs, thyristors, or GTOs. A unipolar transistor such as an FET has a gate, a drain, and a source as its terminals, a bipolar transistor has a base, an emitter, and a collector as its terminals, and an IGBT has a gate, an emitter, and a collector as its terminals, and a thyristor and a GTO has a gate, an anode, and a cathode as their terminals. Note that when bipolar transistors are used as the power devices that allow a current of varying intensity to pass through them as a function of the gate voltage applied, "gate voltage" is read as "base voltage" in applying the aspect of the present disclosure. Similarly, depending on the power devices used, "drain" and "source" or "anode" and "cathode" are read as "emitter" and "collector" in applying the aspect of the present disclosure.

In the normal operation mode for operating the motor 2, the inverter 12 switches on and off the power devices inside in accordance with switching commands received from the motor control unit 17 and converts the DC power supplied by the converter 11 through the DC link into an AC power of desired voltage and desired frequency to drive the motor 2 (inversion operation). The motor 2 thus operates by the supplied power of variable voltage and variable frequency. Further, in the normal operation mode, when the motor 2 slows down and regenerative power is generated, the inverter 12 switches on and off the power devices inside in accordance with switching commands received from the motor control unit 17 and converts the regenerative AC power generated by the motor 2 to DC power and returns the DC power to the DC link (conversion operation). Further, in a mode for detecting an abnormality of a power device (hereinafter referred to as "the diagnosis mode"), which is different from the normal operation mode and will be described later in detail, the inverter 12 is controlled by the constant current control unit 15 in such a manner as to allow a very small constant current to pass through the detection target power device. Although FIG. 1 illustrates an example in which the constant current control unit 15 performs constant current control in the diagnosis mode through the motor control unit 17, the constant current control unit 15 may directly control the inverter 12.

The shut-off circuit 14 opens and closes the electrical path between the AC power source 3 and the converter 11 in accordance with commands received from the shut-off command unit 21, which will be described later. The shut-off circuit 14 may be, for example, an electromagnetic contactor or a relay. Similarly to common motor drive apparatuses, in the normal operation mode for operating the motor 2, the shut-off circuit 14 opens the electrical path between the AC power source 3 and the converter 11 upon excess current in the electrical path between the AC power source 3 and the converter 11 in accordance with a command received from the shut-off command unit 21 and shuts off the supply of AC power from the AC power source 3 to the converter 11. The operation of the shut-off circuit 14 in the diagnosis mode will be described later.

To perform an abnormality detection processing on a detection target power device, the operation is switched from the normal operation mode to the diagnosis mode. The constant current control unit 15 and the abnormality detection unit 16 mainly operate in the diagnosis mode. The switchover from the operation mode to the diagnosis mode is done by, for example, turning a key or pushing down an operation button of the operation terminal of the numerical control apparatus connected with the motor drive apparatus 1 or pressing down an operation button provided for the motor drive apparatus 1.

In the diagnosis mode, the constant current control unit 15 allows a constant current to pass through a detection target power device and the abnormality detection unit 16 determines whether or not an abnormality has occurred in the detection target power devices. The detection target power device is selected from among the power devices existing in the inverter 12, and the constant current control unit 15 and the abnormality detection unit 16 perform processing on the selected detection target power device one at a time. For example, detection target power devices are selected one by one from among the power devices in the diagnosis mode and the constant current control unit 15 and the abnormality detection unit 16 may perform processing on all the detection target power devices one by one. In such a case, the process of selecting detection target power devices from among the power devices and the series of processing by the constant current control unit 15 and the abnormality detection unit 16 are executed, for example, automatically in accordance with a software program. Further, for example, a detection target power device may be selected from among the power devices by choice and the constant current control unit 15 and the abnormality detection unit 16 perform processing on the selected device. In such a case, the instruction as to which one of the power devices is selected as detection target power device can be given by operating a certain key of the operation terminal of the numerical control apparatus connected with the motor drive apparatus 1 or pressing down an operation button provided for the motor drive apparatus 1.

The constant current control unit 15 performs control to allow a constant current to pass a detection target power device selected among the power devices of the inverter 12, the constant current being supplied by the capacitor 13 charged with DC power. As described later in detail, in the diagnosis mode, the abnormality detection unit 16 detects an abnormality in the detection target power device, through which the constant current passes, based on changes in the voltage between the collector and the emitter of the detection target power device and the constant current control unit 15 serves to effectuate and control this constant current. The constant current passing through the detection target power device in the diagnosis mode may be much smaller than the current passing through the power devices in the normal operation mode.

In particular, the constant current control unit 15 includes a shut-off command unit 21, a current detection unit 22, and a gate voltage adjustment unit 23.

The shut-off command unit 21 issues commands to the shut-off circuit 14 to open or close the electrical path between the AC power source 3 and the converter 11. In the diagnosis mode in which to detect an abnormality in a power device, the shut-off command unit 21 issues a command to the shut-off circuit 14 to open the electrical path between the AC power source 3 and the converter 11 to shut off the supply of AC power from the AC power source 3 to the converter 11. As described above, in the normal operation mode for operating the motor 2, the shut-off command unit 21 issues a command to the shut-off circuit 14 to open the electrical path between the AC power source 3 and the converter 11 upon excess current in the electrical path between the AC power source 3 and the converter 11, similarly to common servo motor drive apparatuses.

The current detection unit 22 detects the current passing from the inverter 12 to the motor 2. A current detection unit, used for detecting the current passing from the inverter 12 to the motor 2 for the control of the inverter 12 by the motor control unit 17, may also serve as the current detection unit 22.

During the period in which the supply of AC power from the AC power source 3 to the converter 11 is shut off by the shut-off circuit 14 in accordance with a command by the shut-off command unit 21 (i.e., in the diagnosis mode), the gate voltage adjustment unit 23 adjusts the gate voltage applied to a power device provided for a different phase and a different arm from the phase and the arm for which the detection target power device is provided (hereinafter referred to as "gate voltage adjustment target power device"), based on the current detected by the current detection unit 22, to allow a constant current supplied by the capacitor 13 charged with DC power to pass through the detection target power device. Since a current (i.e. a constant current supplied by the capacitor 13 charged with DC power) preferably passes through the detection target power device in the diagnosis mode, the gate voltage adjustment unit 23 applies to the detection target power device a gate voltage such as to allow the passage of such a current.

The constant current control unit 15 includes a shut-off command unit 21, a current detection unit 22, and a gate voltage adjustment unit 23 and performs constant current control processing, details of which will be described later.

The abnormality detection unit 16 detects an abnormality in the detection target power device, based on changes in the voltage between the collector and the emitter of the detection target power device during the period in which the constant current passes through the detection target power device (i.e., in the diagnosis mode).

In particular, the abnormality detection unit 16 includes a voltage detection unit 31, a storage unit 32, and a determination unit 33.

The voltage detection unit 31 detects the voltage between the collector and the emitter of each power device. In particular, the voltage, detected by the voltage detection unit 31, between the collector and the emitter of the detection target power device selected from among the power devices is stored in the storage unit 32 and used for determination processing by the determination unit 33.

The storage unit 32 stores the changes in the voltage between the collector and the emitter of the detection target power device detected by the voltage detection unit 31 during the period in which the constant current passes through the detection target power device (i.e., in the diagnosis mode). As described below, since the voltage between the collector and the emitter of the detection target power device is proportional to the temperature inside the power device, the voltage between the collector and the emitter of the detection target power device detected by the voltage detection unit 31 in the diagnosis mode gradually decreases as the temperature inside the power device gradually falls as time passes. The storage unit 32 stores the changes in the voltage between the collector and the emitter of the detection target power device (i.e., changes in the trend of decrease in voltage) in order of time. The storage unit 32 includes, for example, electrically erasable and recordable non-volatile memory such as, for example, EEPROM (registered trademark) or random access memory readable and writable at high speed such as, for example, DRAM or SRAM. Alternatively, the storage unit 32 may be provided in a region of a storage device used for driving the motor 2 by the motor drive apparatus 1 in the normal operation mode.

The determination unit 33 determines that an abnormality has occurred in the detection target power device when a certain threshold value is exceeded by the amount of difference between the changes in the voltage between the collector and the emitter of the detection target power device detected by the voltage detection unit 31 and stored in the storage unit 32 and the changes in the voltage between the collector and the emitter of the detection target power device detected by the voltage detection unit 31 during a period in which a constant current passed through the detection target power device and which is previous to the period in which the voltage changes in question have been detected (i.e., during a diagnosis mode operation previous to the diagnosis mode operation in which the voltage changes in question have been detected). The "diagnosis mode operation previous to the diagnosis mode operation in which the voltage changes in question have been detected" is preferably a diagnosis mode operation executed when the inverter 12 is in pristine condition (i.e., when the power devices are also in pristine condition). In other words, while the power devices are in pristine condition, the abnormality detection unit 16 performs processing on each of the power devices of the inverter 12 and the voltage between the collector and the emitter of each power device detected by the voltage detection unit 31 is stored in the storage unit 32 as default information. In subsequent diagnosis mode operations, the abnormality determination unit 33 determines that an abnormality has occurred in the detection target power device when a certain threshold value is exceeded by the amount of difference obtained by comparing the changes in the voltage between the collector and the emitter of the detection target power device detected by the voltage detection unit 31 and stored in the storage unit 32 with the changes in voltage between the collector and the emitter of the detection target power device stored as default information.

The result of determination by the determination unit 33 is notified to the user of the motor drive apparatus 1. Examples of means of notification to the user include a display device of a personal computer, a mobile terminal, and a touch panel as well as a display device mounted to the numerical control apparatus (not illustrated) provided in the motor drive apparatus 1 and the result of determination such as "an abnormality has occurred in the power device" or "the power device is working normally" is expressed on the display, for example, in letters and pictures. Further, for example, notification may be made by means of audio equipment producing voice or sounds such as a speaker, a buzzer, or chimes. Further, notification may be made by printing the result of determination on a sheet of paper by a printer. Further still, these means may be combined as appropriate.

The constant current control processing by the constant current control unit 15, which includes a shut-off command unit 21, a current detection unit 22, and a gate voltage adjustment unit 23, will be described next with reference to FIGS. 2A, 2B, and 3.

Figure 2A:
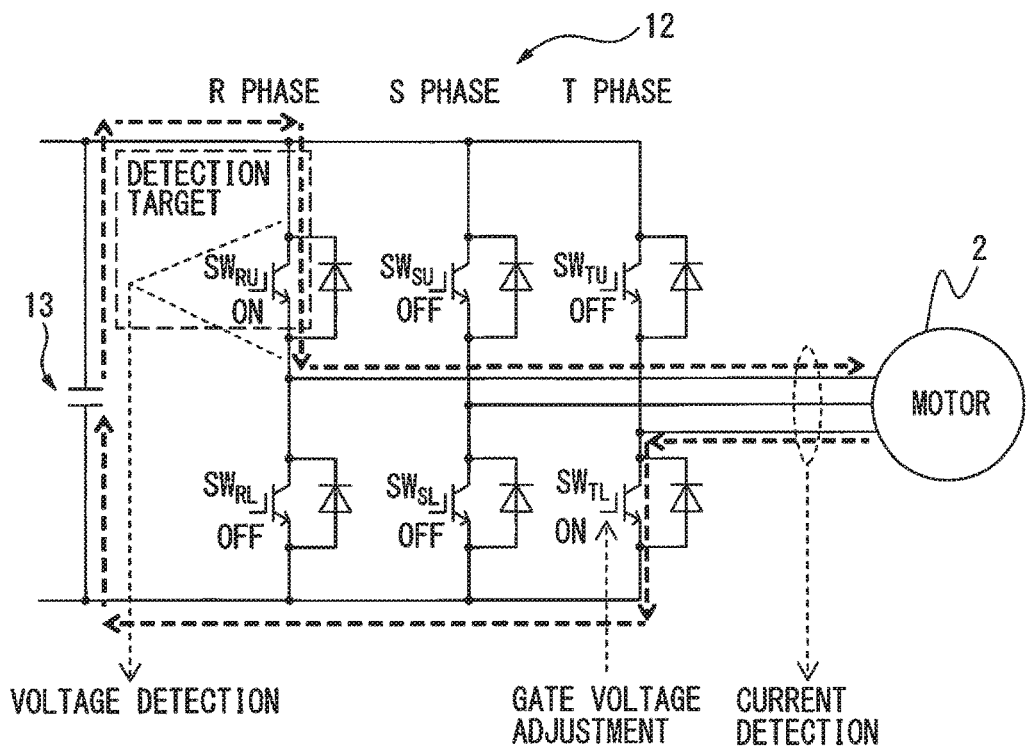
FIGS. 2A and 2B are circuit diagrams for illustrating operation examples of the constant current control unit of the motor drive apparatus according to an embodiment.
Figure 2B:
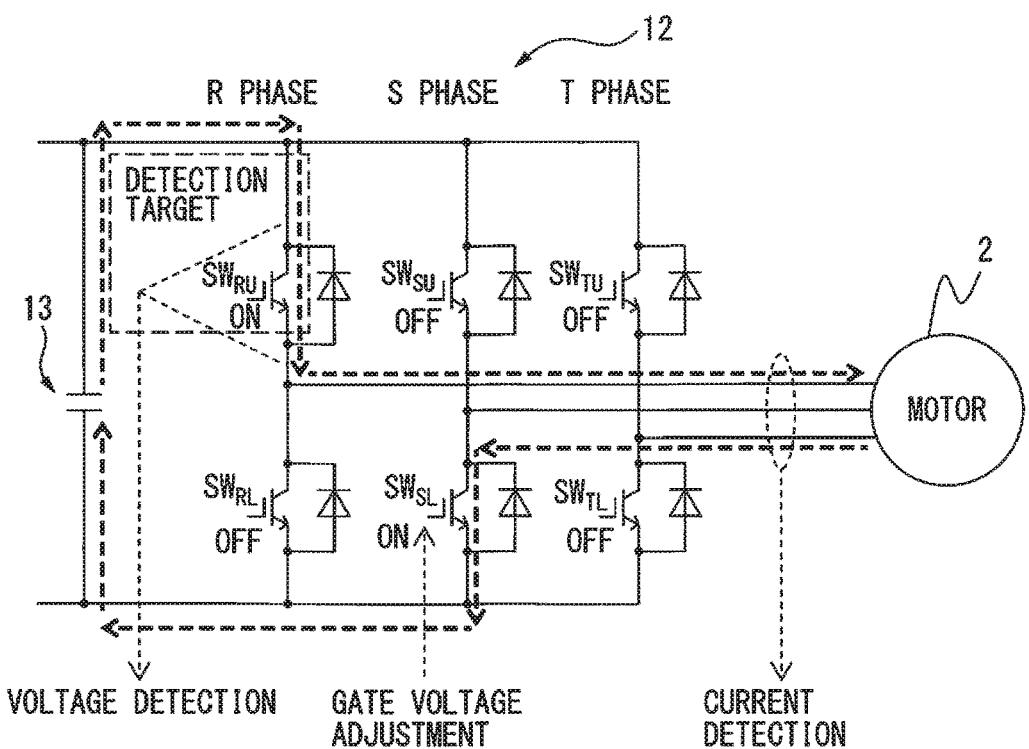

FIGS. 2A and 2B are circuit diagrams for illustrating operation examples of the constant current control unit of the motor drive apparatus according to an embodiment. In FIGS. 2A and 2B, the constituent features of the motor drive apparatus 1 are omitted except for the inverter 12 and the capacitor 13. FIG. 3 illustrates relationships between the gate voltage, the voltage between the collector and the emitter, and the collector current of the power device;

The inverter 12 illustrated in FIGS. 2A and 2B is constituted as a three-phase full-bridge inverter. The power device in R phase on the upper arm is referred to $SW_{RU}$, the power device in R phase on the lower arm is referred to $SW_{RL}$, the power device in S phase on the upper arm is referred to $SW_{SU}$, the power device in S phase on the lower arm is referred to $SW_{SL}$, the power device in T phase on the upper arm is referred to $SW_{TU}$, and the power device in T phase on the lower arm is referred to $SW_{TL}$. Each power device is in antiparallel connection with a diode. When, for example, the power device $SW_{RU}$ in R phase on the upper arm is selected as the examination target power device from among the power devices, constant current control processing is performed as follows.

Figure 3:
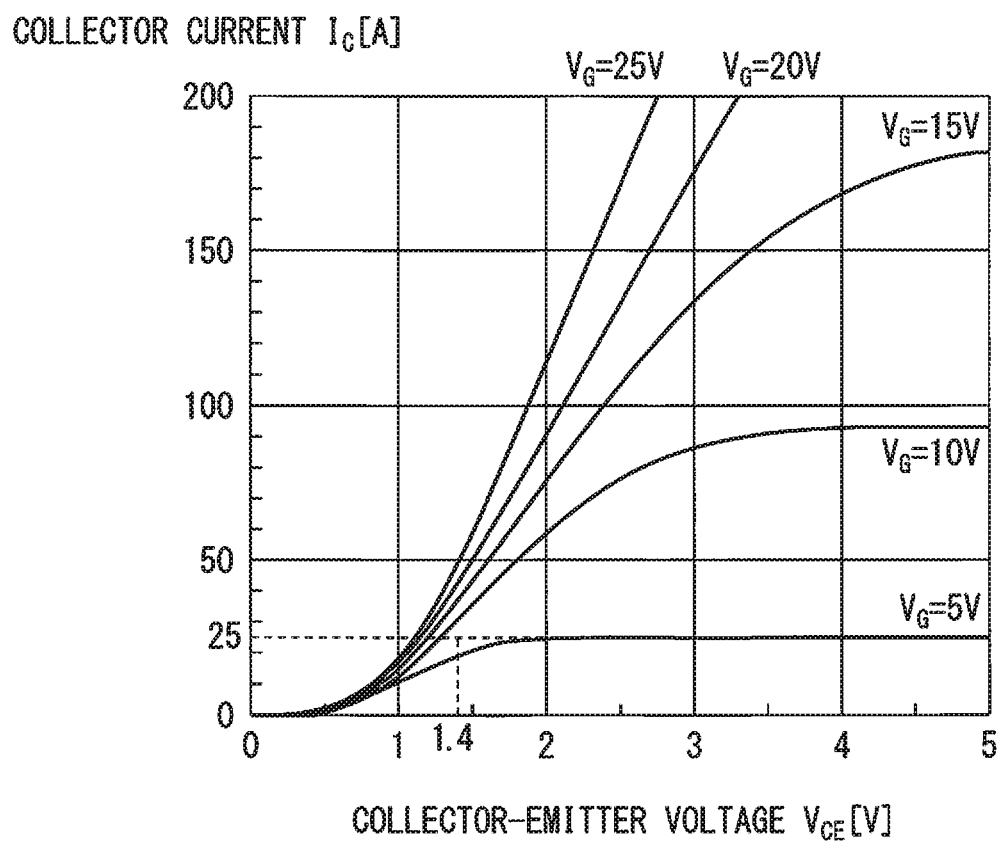
FIG. 3 illustrates relationships between the gate voltage, the voltage between the collector and the emitter, and the collector current of the power device.

The power device, which is a semiconductor switching device that allows a current of varying intensity to pass through it as a function of the gate voltage applied, has voltage-current characteristics as illustrated in FIG. 3. The numerical values in FIG. 3 are given merely as an example and in practice each power device has its own proper values. In addition, in FIG. 3, the gate voltage $V_G$ is given in discrete values of 5 V, 10 V, 15 V, 20 V, and 25 V as an example but, needless to say, the values of the gate voltage $V_G$ are not limited to these discrete values and can take other values, for example, values between 5 V and 10 V. As illustrated in FIG. 3, for example, with a gate voltage $V_G$ of 5 V applied to the power device, the collector current $I_C$ increases as the voltage between the collector and the emitter $V_{CE}$ increases as long as the voltage between the collector and the emitter $V_{CE}$ is between 0 V and about 2 V; however, the collector current $I_C$ reaches saturation and becomes a constant current of about 25 A when the voltage between the collector and the emitter $V_{CE}$ exceeds about 2 V. For example, with a gate voltage $V_G$ of 10 V applied to the power device, the collector current $I_C$ increases as the voltage between the collector and the emitter $V_{CE}$ increases as long as the voltage between the collector and the emitter $V_{CE}$ is between 0 V and about 4 V; however, the collector current $I_C$ reaches saturation and becomes a constant current of about 90 A when the voltage between the collector and the emitter $V_{CE}$ exceeds about 4 V. Further, for example, with a gate voltage $V_G$ of 15 V applied to the power device, the collector current $I_C$ increases even when the voltage between the collector and the emitter $V_{CE}$ is between 0 V and about 5 V. As described above, the power device has a characteristic such that the collector current $I_C$ changes as a function of the applied gate voltage $V_G$ and the voltage between the collector and the emitter $V_{CE}$. According to one aspect of the present disclosure, the gate voltage adjustment unit 23 utilizes this characteristic of the power device to allow a constant current to pass through the detection target power device.

A constant current is effectuated as follows, using the capacitor 13 charged with DC power as supply source (generation source).

In the normal operation mode for operating the motor 2, the inverter 12 converts the DC power supplied by the converter 11 through the DC link into an AC power of desired voltage and desired frequency to drive the motor 2 and, at this time, the capacitor 13 provided in the DC link stores DC power. When the operation is switched from the normal operation mode to the diagnosis mode, the shut-off command unit 21 issues a command to the shut-off circuit 14 to open the electrical path between the AC power source 3 and the converter 11 to shut off the supply of AC power from the AC power source 3 to the converter 11. Thus, the capacitor 13 is charged with DC power. The gate voltage adjustment unit 23 then adjusts the gate voltage applied to a gate voltage adjustment target power device provided for a different phase and a different arm from the R phase and the upper arm, for which the detection target power device is provided, to create a current path including the gate voltage adjustment target power device, the detection target power device, the motor 2, and the capacitor 13. The capacitor 13 charged with DC power serves as the supply source for a constant current passing through this current path.

FIG. 2A illustrates an example in which the power device $SW_{TL}$ is selected as gate voltage adjustment target power device as the power device $SW_{TL}$ is provided for T phase, which is a different phase from R phase for which the detection target power device $SW_{RU}$ is provided, and the power device $SW_{TL}$ is provided for the lower arm, which is different from the upper arm for which the detection target power device $SW_{RU}$ is provided. Further, as illustrated in FIG. 2B, the power device $SW_{SL}$ may also be selected as gate voltage adjustment target power device as the power device $SW_{SL}$ is provided for S phase, which is a different phase from R phase for which the detection target power device $SW_{RU}$ is provided, and the power device $SW_{SL}$ is provided in the lower arm, which is different from the upper arm in which the detection target power device $SW_{RU}$ is provided. As described above, for each detection target power device, there are two potential gate voltage adjustment target power devices. At least one of these two is selected as gate voltage adjustment target power device.

The intensity of the constant current is controlled by the gate voltage adjustment unit 23 as in the following process.

As illustrated in FIG. 2A, when the gate voltage adjustment unit 23 applies a gate voltage to the detection target power device $SW_{RU}$ to allow a current to pass through it and adjusts the gate voltage applied to the power device $SW_{TL}$, a current path is formed consisting of the capacitor 13, the detection target power device $SW_{RU}$, the R phase terminal of the motor 2, and the T phase terminal of the motor 2, and the gate voltage adjustment target power device $SW_{TL}$, as depicted by thick dotted line in the drawing. As a result, a current supplied by the capacitor 13 charged with DC power as supply source (generation source) passes through the detection target power device $SW_{RU}$ and the gate voltage adjustment target power device $SW_{TL}$. The current passing through the detection target power device $SW_{RU}$ and the gate voltage adjustment target power device $SW_{TL}$ is detected by the current detection unit 22. The gate voltage adjustment unit 23 adjusts the gate voltage in such a manner as to keep the current detected by the current detection unit 22 constant.

A case will be described, as an example, in which a current path as illustrated in FIG. 2A is formed in the diagnosis mode and the voltage-current characteristics of the power device $SW_{TL}$ are as illustrated in FIG. 3. When it is desired, for example, that a constant current of 25 A should pass through the detection target power device $SW_{RU}$ as its collector current $I_C$ and when the voltage between the collector and the emitter $V_{CE}$ of the detection target power device $SW_{RU}$ is 3 V, a gate voltage $V_G$ of 5 V is applied to the gate voltage adjustment target power device $SW_{TL}$. However, since the supply of DC power from the converter 11 is shut off by the shut-off circuit 14 in the diagnosis mode, the capacitor 13 discharges as time passes, the DC power (in other words, electric charge) stored in the capacitor 13 gradually decreases and the voltage across the capacitor 13 gradually decreases, which results in a gradual decrease in the voltage between the collector and the emitter $V_{CE}$ of the detection target power device $SW_{RU}$. When, for example, the voltage between the collector and the emitter of the detection target power device $SW_{RU}$ decreases to 1.4 V and the gate voltage $V_G$ applied to the gate voltage adjustment target power device $SW_{TL}$ is kept at 5 V, the collector current $I_C$ of the detection target power device $SW_{RU}$ will not be maintained as a constant current of 25 A. To address this, the gate voltage adjustment unit 23 makes adjustment by increasing the gate voltage $V_G$ applied to the gate voltage adjustment target power device $SW_{TL}$ to 10 V. The gate voltage adjustment unit 23 maintains the gate voltage of the gate voltage adjustment target power device $SW_{TL}$ as long as the collector current $I_C$ of the detection target power device $SW_{RU}$ is in the saturation state, and the gate voltage adjustment unit 23 makes adjustment by increasing the gate voltage of the gate voltage adjustment target power device $SW_{TL}$ when the collector current $I_C$ of the detection target power device $SW_{RU}$ is out of the saturation state. The above-described example refers to a case in which the gate voltage of the power device $SW_{TL}$ is adjusted as in FIG. 2A, and the adjustment is made in a similar manner when the gate voltage of the power device $SW_{SL}$ is adjusted as in FIG. 2B. In other words, regardless whether the gate voltage adjustment target power device is $SW_{TL}$ or $SW_{SL}$ in relation to the detection target power device $SW_{RU}$, the gate voltage adjustment unit 23 performs the same adjustment processing.

As described above, in the diagnosis mode, since the voltage between the collector and the emitter $V_{CE}$ of the detection target power device $SW_{RU}$ decreases as time passes due to a decrease in the voltage across the capacitor 13, to maintain the collector current $I_C$ passing through detection target power device $SW_{RU}$, the gate voltage adjustment unit 23 monitors the current detected by the current detection unit 22 and makes adjustment to keep this current constant by either "maintaining" or "increasing" the gate voltage of the gate voltage adjustment target power device $SW_{TL}$. As described above, at least one of these two power devices may be selected as gate voltage adjustment target power device and, in a modified example, the gate voltage adjustment unit 23, in selecting a gate voltage adjustment target power device, may switch regularly between two power devices provided for a different phase and a different arm from the phase and the arm for which the detection target power device is provided. This is advantageous in curtailing the heating of the gate voltage adjustment target power devices during the diagnosis mode.

With reference to FIGS. 4 to 6C, abnormality detection processing by the abnormality detection unit 16, which includes the voltage detection unit 31, the storage unit 32, and the determination unit 33, will now be described in detail.

Figure 4:
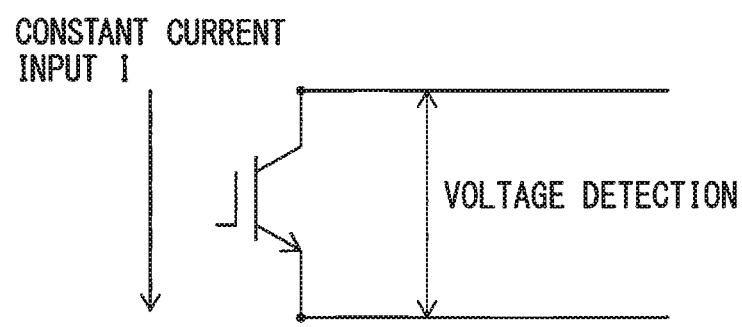
FIG. 4 is a diagram for illustrating an operation of the voltage detection unit in the abnormality detection unit of the motor drive apparatus according to an embodiment.

FIG. 4 is a diagram for illustrating an operation of the voltage detection unit in the abnormality detection unit of the motor drive apparatus according to an embodiment. In the diagnosis mode, the voltage detection unit 31 detects the voltage between the collector and the emitter of the detection target power device through which a constant current passes.

FIG. 5 illustrates examples of relationships between the temperature of the detection target power device and the voltage between the collector and the emitter when a constant current is allowed to pass through the detection target power device. In the diagnosis mode, the temperature of the detection target power device through which a constant current passes falls as time passes, which is accompanied by a decrease in the voltage between the collector and the emitter of the detection target power device.

In general, the temperature inside a power device and the voltage between the collector and the emitter of the power device is in a proportional relation with "K factor" as a proportionality coefficient. The relation is expressed as in equation (1).

Temperature inside the Power Device [° C.]=K Factor [° C./V]×Voltage between the Collector and the Emitter of the Power Device [V]    (1)

Equation 1 is rearranged as equation 2.

Voltage between the Collector and the Emitter of the Power Device [V]=Temperature inside the Power Device [° C.]/K Factor [° C./V]    (2)

From equation 2 it can be seen that the voltage between the collector and the emitter of the power device is proportional to the temperature inside the power device, the reciprocal of K factor being the proportionality coefficient. In other words, as the temperature inside the power device gradually falls as time passes, the voltage between the collector and the emitter of the power device also gradually decreases. It is reasonable to assume that the trend of decrease in the voltage between the collector and the emitter of the detection target power device during an operation in the diagnosis mode is roughly the same as during an operation in the diagnosis mode conducted at a different time if there is no abnormality in the detection target power device (i.e., if the device is not destroyed by heat). In contrast, when there is an abnormality in the detection target power device, different trends of decrease in the voltage between the collector and the emitter of the detection target power device are observed between operations in the diagnosis mode conducted at different times. Hence, according to one aspect of the present disclosure, the abnormality detection unit 16 observes changes in the voltage between the collector and the emitter of the detection target power device (changes in the trend of decrease in the voltage) when a constant current passes through the detection target power device and compares the observed voltage changes with voltage changes observed in the past to detect an abnormality in the detection target power device. Concrete examples are given below.

Figure 6A:
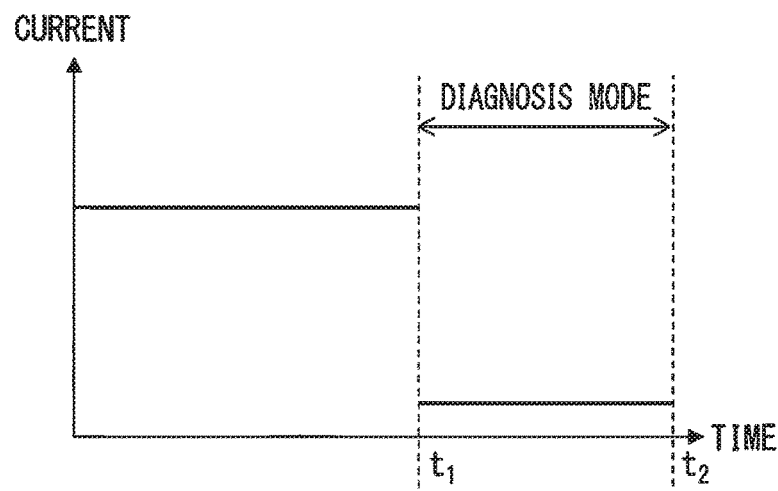
FIG. 6A is a diagram for illustrating an abnormality detection processing by the abnormality detection unit of the motor drive apparatus according to an embodiment and illustrates an example of a current passing through a detection target power device.
Figure 6B:
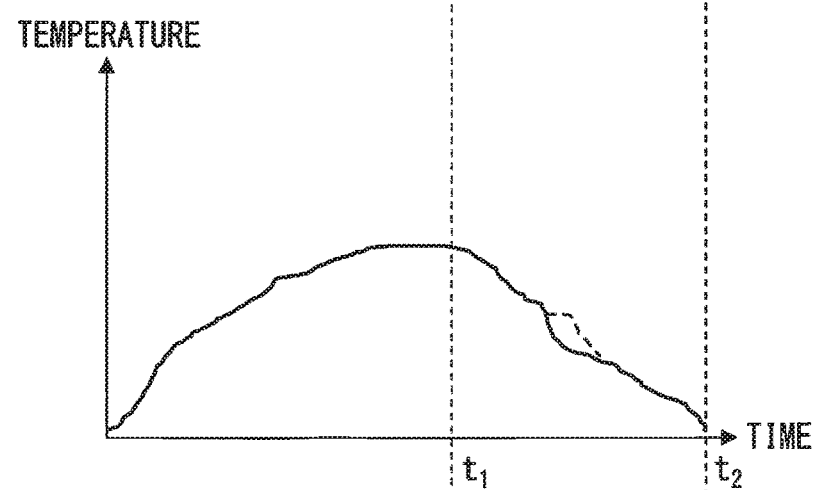
FIG. 6B is a diagram for illustrating an abnormality detection processing by the abnormality detection unit of the motor drive apparatus according to an embodiment and illustrates an example of temperature inside the detection target power device.
Figure 6C:
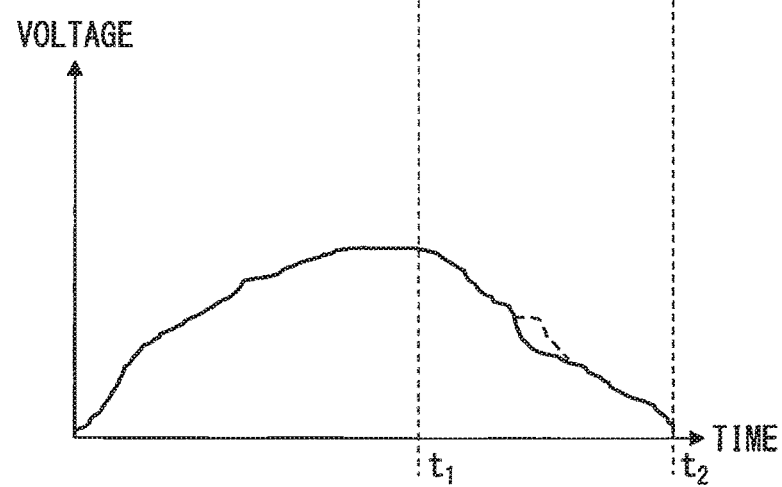
FIG. 6C is a diagram for illustrating an abnormality detection processing by the abnormality detection unit of the motor drive apparatus according to an embodiment and illustrates an example of voltage between the collector and the emitter of the detection target power device.

FIG. 6A is a diagram for illustrating abnormality detection processing by the abnormality detection unit of the motor drive apparatus according to an embodiment and illustrates an example of a current passing through the detection target power device. FIG. 6B is a diagram for illustrating abnormality detection processing by the abnormality detection unit of the motor drive apparatus according to the embodiment and illustrates an example of temperature inside the detection target power device. FIG. 6C is a diagram for illustrating abnormality detection processing by the abnormality detection unit of the motor drive apparatus according to the embodiment and illustrates an example of voltage between the collector and the emitter of the detection target power device. FIGS. 6A, 6B, and 6C illustrates, as an example, an operation which is in the normal operation mode from time 0 to $t_1$ and in the diagnosis mode from time $t_1$ to time $t_2$. In the normal operation mode, the temperature of the power device (detection target power device) rises as a current passes through it (FIG. 6B) and the voltage between the collector and the emitter of the power device (detection target power device) increases in proportion to the temperature rise (FIG. 6C). When the operation is switched over to the diagnosis mode at time $t_1$, the constant current control unit 15 performs control to shut off the supply of DC power from the converter 11 and a constant current supplied by the capacitor 13 charged with DC power starts to pass through the detection target power device. Since the constant current passing through the detection target power device in the diagnosis mode is much smaller than the current in the normal operation mode, the temperature inside the detection target power device falls in the diagnosis mode (FIG. 6B) and the voltage between the collector and the emitter of the power device (detection target power device), which is proportional to the temperature, also decreases in a trend similar to the falling temperature (FIG. 6C). It is reasonable to assume that the trend of decrease in the voltage between the collector and the emitter of the detection target power device during an operation in the diagnosis mode is roughly the same as during an operation in the diagnosis mode conducted at a different time if there is no abnormality in the detection target power device. In contrast, when there is an abnormality in the detection target power device, different trends of decrease in the voltage between the collector and the emitter of the detection target power device are observed between operations in the diagnosis mode conducted at different times. FIG. 6B illustrates by broken line a difference in temperature changes between operations in the diagnosis mode conducted at different times, which results from an abnormality in the detection target power device, and FIG. 6C illustrates by broken line a difference in voltage changes between operations in the diagnosis mode conducted at different times, which results from an abnormality in the detection target power device. In one aspect of the present disclosure, the abnormality detection unit 16 detects an abnormality in the detection target power device, based on the amount of this difference.

As described above, the abnormality detection unit 16 observes changes in the voltage between the collector and the emitter of the detection target power device (changes in the trend of decrease in the voltage) in order of time when a constant current passes through the detection target power device, and the abnormality detection unit 16 stores this in the storage unit 32. The determination unit 33 in the abnormality detection unit 16 compares changes in the voltage between the collector and the emitter of the detection target power device detected by the voltage detection unit 31 in the diagnosis mode and stored in the storage unit 32 with the changes in the voltage between the collector and the emitter of the detection target power device detected by the voltage detection unit 31 during a period in which a constant current passed through the detection target power device and which is previous to the period in which the voltage changes in question have been detected (i.e., during a diagnosis mode operation previous to the diagnosis mode operation in which the voltage changes in question have been detected) to calculate the amount of difference. The determination unit 33 determines that an abnormality has occurred in the detection target power device when the calculated amount of difference exceeds a certain threshold value.

The determination unit 33 can perform the abnormality determination processing based on the amount of difference of the changes in the voltage between the collector and the emitter of the detection target power device by, for example, using the time integral of the voltage between the collector and the emitter of the detection target power device taken over the period of the diagnosis mode operation. In other words, the abnormality determination processing can be performed by calculating the time integral of the voltage between the collector and the emitter of the detection target power device detected by the voltage detection unit 31 in the diagnosis mode and stored in the storage unit 32 and the time integral of the voltage between the collector and the emitter of the detection target power device detected by the voltage detection unit 31 during a diagnosis mode operation previous to the diagnosis mode operation in question (preferably during a diagnosis mode operation conducted when the detection target power device was new), calculating the difference between these integral values, and taking the absolute value of the calculated difference as the amount of difference. When this amount of difference exceeds a certain threshold value, the determination unit 33 determines that an abnormality has occurred in the detection target power device. Alternatively, the temperature time constant of the semiconductor chip of the power device during the cooling period may be used as the amount of difference.

The threshold value to be used for the determination processing by the determination unit 33 can be appropriately established based on the data accumulated by, for example, operating the motor drive apparatus 1 either in experiment or in actual practical operation, on the environment of use, frequency of destruction by heat, etc., for identical standard power devices. In this procedure, a threshold value may be set at a value smaller than the absolute value of the difference between the time integral of the voltage between the collector and the emitter of the detection target power device detected by the voltage detection unit 31 in an actual case of a destruction by heat and the time integral of the voltage between the collector and the emitter of the detection target power device detected by the voltage detection unit 31 when the detection target power device was in pristine condition. With determination processing by the determination unit 33 based on this threshold value, the user may be notified of an abnormality in the near future before the power device is actually destroyed (i.e., before an abnormality occurs). Experiences or desires of the user of the motor drive apparatus 1 may additionally be taken into consideration in setting the threshold value.

The motor drive apparatus 1 according to the above-described aspect of the present disclosure enables accurate detection of an abnormality in a power device caused by heat. It also allows cost reduction as no temperature sensor is used. Further, based on the result of detection by the abnormality detection unit 16, the user of the motor drive apparatus 1 may be notified that "there is a chance of an abnormality in the power device in the near future" before an actual occurrence of abnormality in the power device. As a result, it is possible to replace power devices before they fail, not missing the appropriate timing for replacing power devices, thereby preventing power device failures and serious accidents. Since the power devices can be timely replaced, excessive allowance in design can be reduced and the stock of power devices can be decreased.

The above-described constant current control unit 15, the abnormality detection unit 16, and the motor control unit 17 may be realized, for example, by a software program or a combination of electronic circuits of various kinds and a software program. When, for example, these units are realized by a software program, the above-described functions of these units are realized by a computer that operates according to the software program or by an arithmetic processing unit in a numerical control apparatus connected with the motor drive apparatus 1 that executes the software program. Alternatively, the constant current control unit 15, the abnormality detection unit 16, and the motor control unit 17 may be realized by a semiconductor integrated circuit with a software program written therein to carry out the functions of these units.

Further, for example, when a plurality of motor drive apparatuses 1 are employed and the control systems of the motor drive apparatuses 1 are connected with each other via a communication network, results of determination by the abnormality detection units 16 of the motor drive apparatuses 1 may be shared on a cloud server.

Further, for example, when a plurality of manufacturing cells each including a machine tool equipped with a motor drive apparatus 1 are connected with each other via a communication network, results of determination by the abnormality detection units 16 of the motor drive apparatuses 1 may be shared by cell controllers superordinate to the manufacturing cells or by a production control apparatus superordinate to the cell controllers.

A manufacturing cell is a set of machine tools flexibly combined for product manufacturing. A manufacturing cell is formed by, for example, a plurality of machine tools or a plurality of kinds of machine tools, and may be formed by any number of machine tools. For example, a manufacturing cell may be a manufacturing line in which a workpiece is machined by a plurality of machine tools and made into a finished product. Further, for example, a manufacturing cell may be a manufacturing line in which two or more articles (components) respectively machined by two or more machine tools are assembled by another machine tool in the manufacturing process into a finished article (product). Further, for example, two or more articles machined in two or more manufacturing cells may be assembled into a finished article (product). Manufacturing cells and cell controllers are communicably connected with each other via a communication network such as an intranet. Manufacturing cells are organized in a factory where the products are manufactured. Cell controllers may be provided in the factory where manufacturing cells are organized or in a building separate from the factory. For example, cell controllers may be provided in a separate building located on the same premise as the factory where manufacturing cells are organized.

A production control apparatus is provided superordinate to cell controllers. A production control apparatus is mutually communicably connected with cell controllers and give instructions to the cell controllers according to a production plan. A production control apparatus may be provided in an office remotely located from the factory. In such a case, the cell controllers and the production control apparatus are mutually communicably connected via a communication network such as the Internet.

In such a production system, a display device provided for a cell controller or a production control apparatus may be caused to display information such as identification information of a power device in which it is determined that an abnormality has occurred, identification information of the inverter including the power device, identification information of the motor drive apparatus 1 including the inverter, and identification information of the manufacturing cell including the motor drive apparatus 1. Instead of or in addition to the display device, audio equipment may be used to produce an alarm sound or a buzz to notify the user of an abnormality detected in a power device. This allows the workers and supervisors working in the factory to learn easily that there is a chance of an abnormality in the power device in the near future before the power device is actually destroyed by heat (i.e., before an abnormality occurs). As a result, it is possible to replace power devices before they fail, not missing the appropriate timing for replacing power devices, thereby preventing power device failures and serious accidents.

FIG. 7 is a flowchart illustrating an operation of the motor drive apparatus according to an embodiment.

In Step S101 the abnormality detection unit 16 performs processing on each of the power devices in the inverter 12 when they are in pristine condition and, for each of the power devices, the changes in the voltage between the collector and the emitter detected by the voltage detection unit 31 are stored in the storage unit 32 as default information.

In S102, the motor drive apparatus 1 stops the normal drive operation of the motor 2 and switches from the operation mode over to the diagnosis mode. From Step S102 onwards, the motor drive apparatus 1 operates in the diagnosis mode. The switchover from the operation mode to the diagnosis mode is done by, for example, operating a certain key of the operation terminal of the numerical control apparatus connected with the motor drive apparatus 1 or pressing down an operation button provided for the motor drive apparatus 1.

In Step S103, the shut-off command unit 21 issues a command to the shut-off circuit 14 to open the electrical path between the AC power source 3 and the converter 11. The supply of AC power from the AC power source 3 to the converter 11 is thereby shut off.

In Step S104, the gate voltage adjustment unit 23 applies a gate voltage to the detection target power device to allow a current pass through the detection target power device. This turns on the detection target power device.

In Step S105, the gate voltage adjustment unit 23 adjusts the gate voltage applied to a gate voltage adjustment target power device which is provided for a different phase and a different arm from the phase and the arm for which the detection target power device is provided, based on the current detected by the current detection unit 22. This allows a constant current supplied by the capacitor 13 charged with DC power to pass through the detection target power device.

In Step S106, the voltage detection unit 31 detects the voltage between the collector and the emitter of the detection target power device. The values detected are sent to the storage unit 32.

In Step S107, the storage unit 32 stores the changes in the voltage between the collector and the emitter of the detection target power device detected by the voltage detection unit 31.

In Step S108, the determination unit 33 compares the changes in the voltage between the collector and the emitter of the detection target power device detected by the voltage detection unit 31 and stored in the storage unit 32 with the changes in the voltage between the collector and the emitter of the detection target power device stored as default information and determines whether or not the amount of difference obtained by the comparison exceeds the threshold value.

When it is determined in Step S108 that the amount of difference exceeds the threshold value, the determination unit 33 determines that an abnormality has occurred in the detection target power device (Step S109).

When it is not determined in Step S108 that the amount of difference exceeds the threshold value, the determination unit 33 determines that the detection target power device is in a normal condition (Step S110).

The result of determination in Step S109 and Step S110 is notified to the user of the motor drive apparatus 1.

According to one aspect of the present disclosure, a motor drive apparatus that allows accurate detection of an abnormality in a power device caused by heat can be achieved at a low cost. Further, the user of the motor drive apparatus is notified that there is a chance of an abnormality in a power device in the near future before an actual occurrence of abnormality. As a result, it is possible to replace power devices before they fail, not missing the appropriate timing for replacing power devices, thereby preventing power device failures and serious accidents. Since the power devices can be timely replaced, excessive allowance in design can be reduced and the stock of power devices can be decreased.

The invention claimed is:

1. A motor drive apparatus comprising:
   a converter configured to convert AC power supplied by an AC power source to DC power and to output the DC power to a DC link;
   an inverter including power devices provided for an upper arm and a lower arm, which power devices are ON/OFF controlled by respective gate voltages applied thereto, to convert the DC power in the DC link to AC power for driving a motor;
   a capacitor provided in the DC link;
   a shut-off circuit configured to open and close an electrical path between the AC power source and the converter;
   a constant current control unit configured to perform control in such a manner as to allow a constant current supplied by the capacitor charged with DC power to pass through a detection target power device among the power devices in the inverter; and
   an abnormality detection unit configured to detect an abnormality in the detection target power device based on changes in voltage between a collector and an emitter of the detection target power device during a period in which the constant current passes through the detection target power device.

2. The motor drive apparatus according to claim 1, wherein the constant current control unit comprises:
   a shut-off command unit configured to issue a command to the shut-off circuit to shut off a supply of AC power from the AC power source to the converter;
   a current detection unit configured to detect a current passing from the inverter to the motor; and
   a gate voltage adjustment unit configured to adjust a gate voltage applied to a power device provided for a different phase and a different arm from the phase and the arm for which the detection target power device is provided, based on the current detected by the current detection unit, in such a manner as to allow the constant current supplied by the capacitor charged with DC power to pass through the detection target power device during a period in which the shut-off circuit shuts off the supply of AC power from the AC power source to the converter in accordance with the command by the shut-off command unit.

3. The motor drive apparatus according to claim 2, wherein the gate voltage adjustment unit regularly switches between one and another of the power devices, gate voltages of which are adjusted by the voltage adjustment unit, each of the power devices provided for a different phase and a different arm from the phase and the arm for which the detection target power device is provided.

4. The motor drive apparatus according to claim 1, wherein the abnormality detection unit comprises:
- a voltage detection unit configured to detect a voltage between the collector and the emitter of each power device;
- a storage unit configured to store changes in the voltage between the collector and the emitter of the detection target power device detected by the voltage detection unit during a first period in which the constant current passes through the detection target power device; and
- a determination unit configured to determine that an abnormality has occurred in the detection target power device when a certain threshold value is exceeded by an amount of difference between the changes in the voltage between the collector and the emitter of the detection target power device detected by the voltage detection unit and stored in the storage unit and changes in voltage between the collector and the emitter of the detection target power device detected by the voltage detection unit in a second period in which the constant current passes through the detection target power device and which is previous to the first period.

5. The motor drive apparatus according to claim 1, wherein each of the power devices is a semiconductor switching device that allows a current of varying intensity to pass through the semiconductor switching device as a function of the gate voltage applied.

* * * * *